US010657448B2

(12) United States Patent
Harvey

(10) Patent No.: US 10,657,448 B2
(45) Date of Patent: *May 19, 2020

(54) DEVICES AND METHODS TO NAVIGATE IN AREAS USING A MACHINE LEARNING MODEL

(71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/362,866

(22) Filed: Mar. 25, 2019

(65) Prior Publication Data

US 2019/0220757 A1    Jul. 18, 2019

Related U.S. Application Data

(63) Continuation of application No. 15/885,684, filed on Jan. 31, 2018, now Pat. No. 10,282,668, which is a continuation-in-part of application No. 15/453,996, filed on Mar. 9, 2017, now Pat. No. 9,921,068.

(60) Provisional application No. 62/614,511, filed on Jan. 8, 2018.

(51) Int. Cl.

| G06N 5/04 | (2006.01) |
|---|---|
| G06N 3/08 | (2006.01) |
| G06N 3/04 | (2006.01) |
| G06K 9/00 | (2006.01) |
| G06K 9/62 | (2006.01) |
| G06Q 50/26 | (2012.01) |
| G06Q 50/30 | (2012.01) |
| G01C 21/20 | (2006.01) |
| G06N 20/00 | (2019.01) |

(52) U.S. Cl.
CPC .............. *G06N 5/04* (2013.01); *G01C 21/20* (2013.01); *G01C 21/206* (2013.01); *G06K 9/00335* (2013.01); *G06K 9/00771* (2013.01); *G06K 9/6274* (2013.01); *G06K 9/6284* (2013.01); *G06N 3/0445* (2013.01); *G06N 3/084* (2013.01); *G06N 20/00* (2019.01); *G06Q 50/26* (2013.01); *G06Q 50/30* (2013.01)

(58) Field of Classification Search
None
See application file for complete search history.

(56) References Cited

U.S. PATENT DOCUMENTS

| 2016/0161269 A1* | 6/2016 | Needham ........... G01C 21/3438 701/410 |
| 2016/0335552 A1* | 11/2016 | Longo .................... G06N 5/047 |

* cited by examiner

*Primary Examiner* — Abdesh K Jha

(57) ABSTRACT

A system and method of navigating in areas. A machine learning model is trained in multiple levels with data concerning basic interpretation of sensors and with analysis of the layout of areas. The model is downloaded to a second processor which may further train the model with sensor data gathered after the download. Additional sensor data along with data from a server or other sources may be used as an input to the model and the second or another processor evaluates the model with the inputs to create outputs which determine the state of compliance. Specific applications include movement around in areas of interest. A vehicle which is controlled by a driver or by data from the machine loading model and it's analysis may be included. The model is used to calculate a path which may be displayed in visual, auditory or tactile modes.

14 Claims, 11 Drawing Sheets

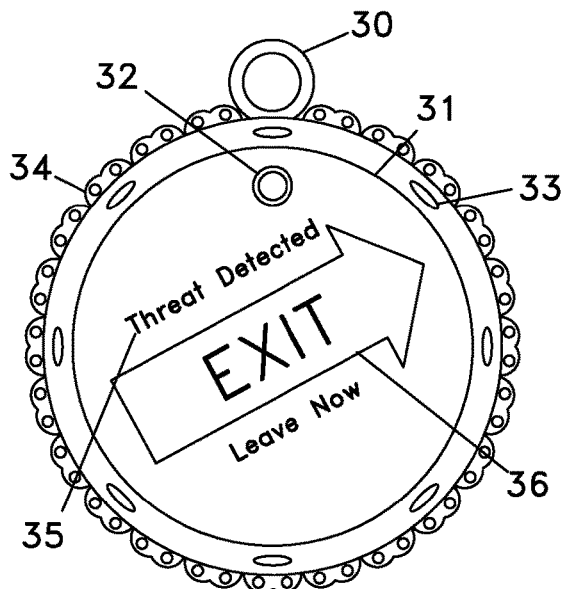
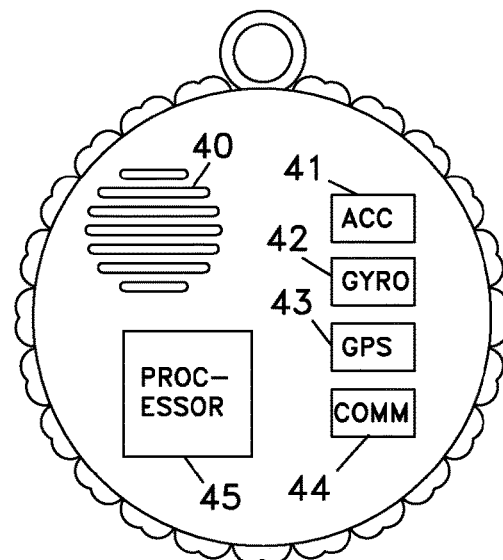
Fig. 3
Fig. 4
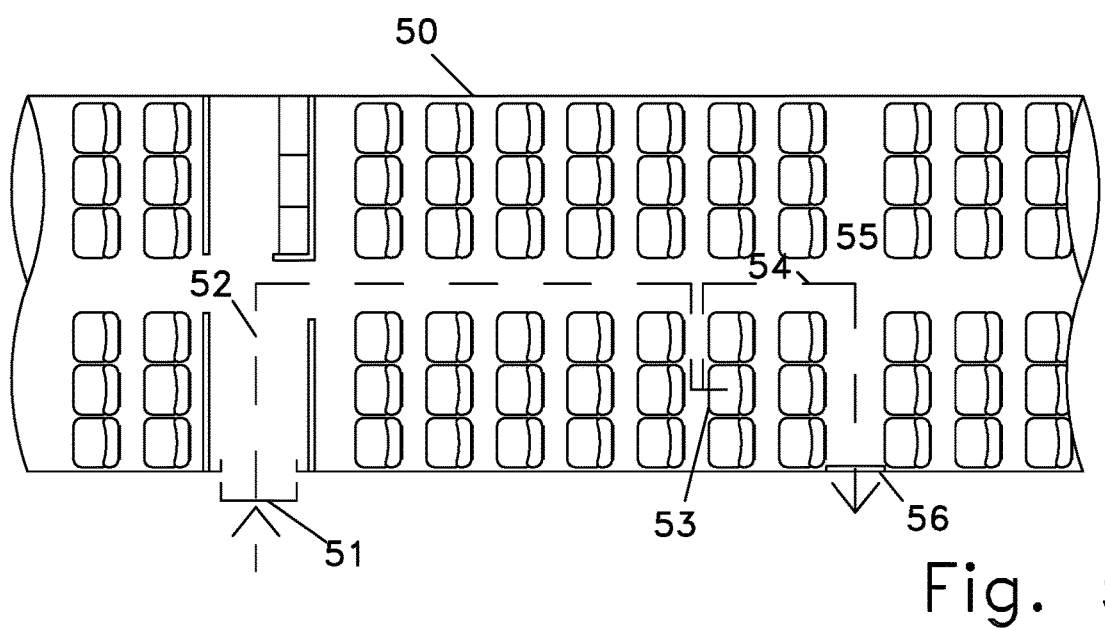
Fig. 5

DEVICES AND METHODS TO NAVIGATE IN AREAS USING A MACHINE LEARNING MODEL

CROSS REFERENCE TO RELATED APPLICATIONS

This application is a continuation of U.S. patent application Ser. No. 15/885,684 filed Jan. 31, 2018 which is a continuation-in-part of U.S. patent application Ser. No. 15/453,996 filed Mar. 9, 2017, now U.S. Pat. No. 9,921,068 and claims priority to U.S. Provisional Application No. 62/614,511 filed Jan. 8, 2018. Each patent application identified above is incorporated here by reference in its entirety to provide continuity of disclosure. Furthermore, where a definition or use of a term in a reference, which is incorporated by reference herein, is inconsistent or contrary to the definition of that term provided herein, the definition of that term provided herein applies and the definition of that term in the reference does not apply.

STATEMENT REGARDING FEDERALLY SPONSORED RESEARCH OR DEVELOPMENT

Not Applicable

FIELD OF THE PRESENT INVENTION

The present invention is in the field of navigation devices.

BACKGROUND OF THE PRESENT INVENTION

Background Concerning the Need for the Invention of the Parent Application

There are many devices available to provide direction and navigation assistance available in the current market place. But in emergency situations directions that are based on the normal situation of a location or venue are insufficient. Current information concerning the exact situation where a person is located, the nature of the emergency and all available clues for escaping to safety are desired. Historically, people have been willing to accept risks that would not be accepted today. Even though many hazardous situations and sudden dangers are relatively rare compared to daily events, many people are concerned about risks and want to have as much protection as possible.

Background Concerning the Need for the Current Invention

When a party offers to allow another party to be in a venue, use a product or be availed of a privilege, the first party often has an interest in the manner in which this is done. It is often necessary to communicate the expectations of the first party to the second party, but establishment of rules that describe the expectations is typically incomplete and difficult. An embodiment of these expectations in a information structure is called herein a standard. The most common such embodiment is a set of rules to be followed by the second party. These are as complete as possible given the limitations of particular situations. For example, a dress code to be communicated in one sentence on a sign at an entrance may only be able to require "normal hair appearance." Such a description is very vague and agreement as to when it applies may not occur. Replacement with more details is only slightly helpful, and there are many dimensions such as length, color, cleanliness, etc. Additional levels of detail may be required but in turn are insufficient requiring distinctions such as rejecting shaving of limited areas while allowing a natural bald area.

In many situations the compilation of objection rules to describe the physical situation which should be deemed to be compliant is so burdensome that no serious attempt is made. This leaves persons who wish to be compliant with no way to know prior to submission to the judgement process, if they will comply. In particular, the judgement process may occur just before granting of the privilege conditional on compliance and long after the period where preparation for compliance can be accomplished. As an example, a person failing a dress code may have to return home to change clothes. This would be extremely inconvenient when only one of a party arriving at a restraint is denied admittance. In the past, certain restaurants maintained a stock of men's jackets to allow compliance. Use of these jackets involved substantial embarrassment and was obvious to other diners.

Another type of embodiment of a standard is a model developed in the memory of a machine learning system as described below. This avoids the necessity of writing explicit rules, communicating the rules to a second party, understanding of the rules by the second party and manual determination of compliance. The advantages of such a system can include the ability to share the system allowing predetermination of the state of compliance and elimination of suspicion of bias on the part of judges of compliance.

BRIEF SUMMARY OF THE INVENTION

Brief Summary of the Parent Invention

The parent invention envisions devices and method using the devices to escape from a venue when a threat is detected. A processor constructs a model of a venue in its memory based on first information which is available prior to entry of a person to be protected from potential hazards. The model is trained by machine learning methods and receives further training after the person enters the venue. The model, thereby, takes into account the location of the person and information gathered by sensors about conditions on entry. Other pre-training can concern methods of escape from typical venues and behaviors by persons in the presence of hazards.

Observed conditions are evaluated by a processor in accordance with the model and the device generates an escape plan when a hazard is detected. The escape plan is displayed or transmitted to the protected person to facilitate escape from the threatened venue. The protected person thereby has an improved chance of successful escape in spite of difficulties that may appear from the threat or the conditions of escape. Warnings of a hazard may be detected and transmitted separately from the plan of escape.

Brief Summary of the Current Invention

The current invention claimed in this application concerns devices and methods to determine whether or not physical elements present in a situation are compliant with a set of rules by using a machine learning system to test compliance from data gathered by one or more sensors. The machine learning system is trained on one processor with data concerning objects and behaviors indicating compliance with the rules. The resulting trained model is downloaded to another processor for field use in determining compliance in specific cases. There is further training of the model with specific information concerning the context of the case to be examined and then data from the sensor is used to determine compliance.

The inputs to the model for the determination come at least from the sensor and perhaps from servers or other sources as well. The output of the evaluation of the model is used to transmit the determination or to control granting of a privilege that is intended to be conditional on compliance with the rules. The additional inputs may be selected on the basis of a previous or partial evaluation of the model or on the basis of data from the sensor. In some cases, more than two processors may be used. For, example one processor may do the pre-training, one the training concerning specific circumstances for the case to be tested, and a third to do the evaluation.

BRIEF DESCRIPTION OF THE SEVERAL VIEWS OF THE DRAWING

FIG. 1 through FIG. 10 appear in the PARENT Application; the remaining figures are new to the CURRENT Application.

Figure 1:
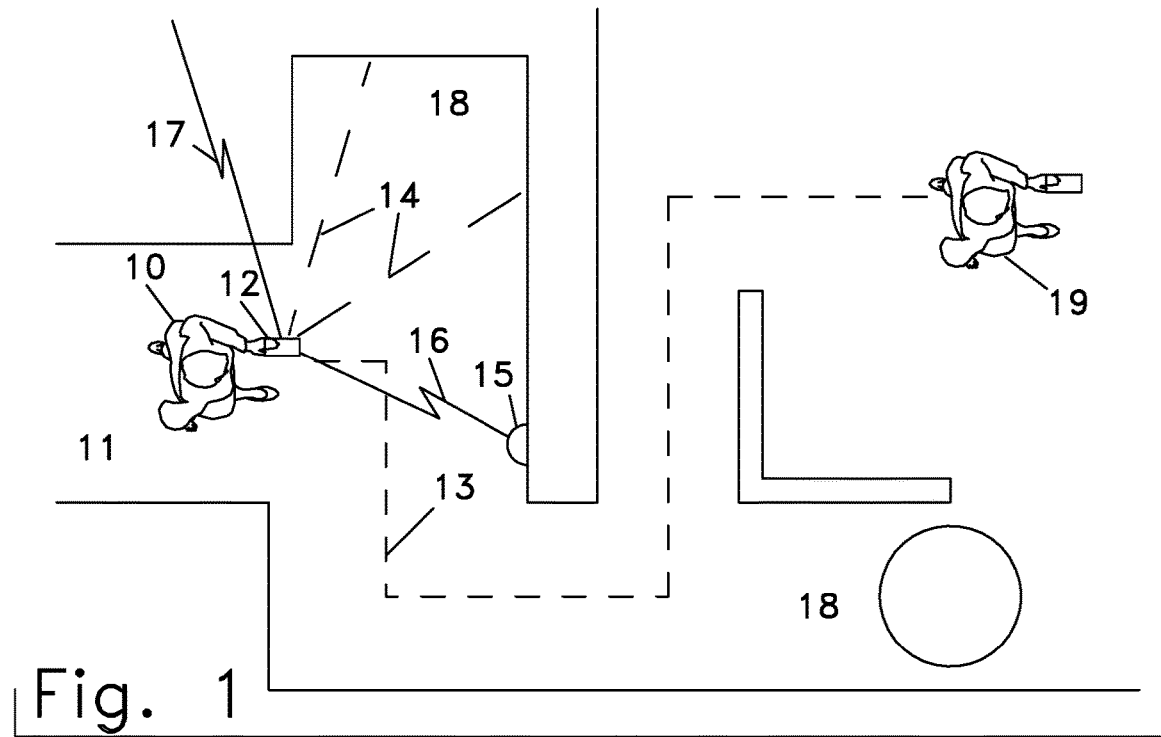

The features and advantages of the various embodiments disclosed herein will be better understood with respect to the drawing in which:

FIG. 1 is plan diagram of a protected person entering a venue with an escape device.

Figure 2:
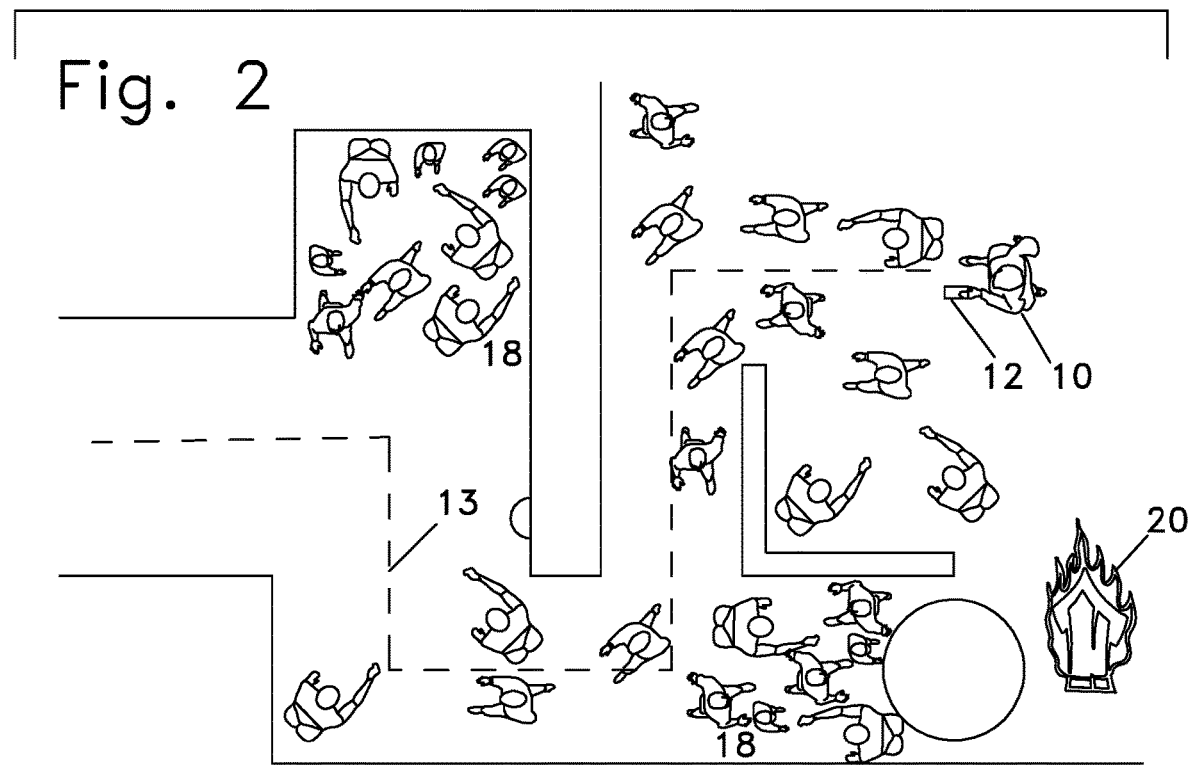

FIG. 2 is plan diagram of a protected person leaving a venue with the guidance of an escape device after a hazard is detected.

FIG. 3 shows a front view of a typical embodiment of an escape guiding device

FIG. 4 shows a back view of the device of FIG. 3.

FIG. 5 shows a venue on board an aircraft.

Figure 6:
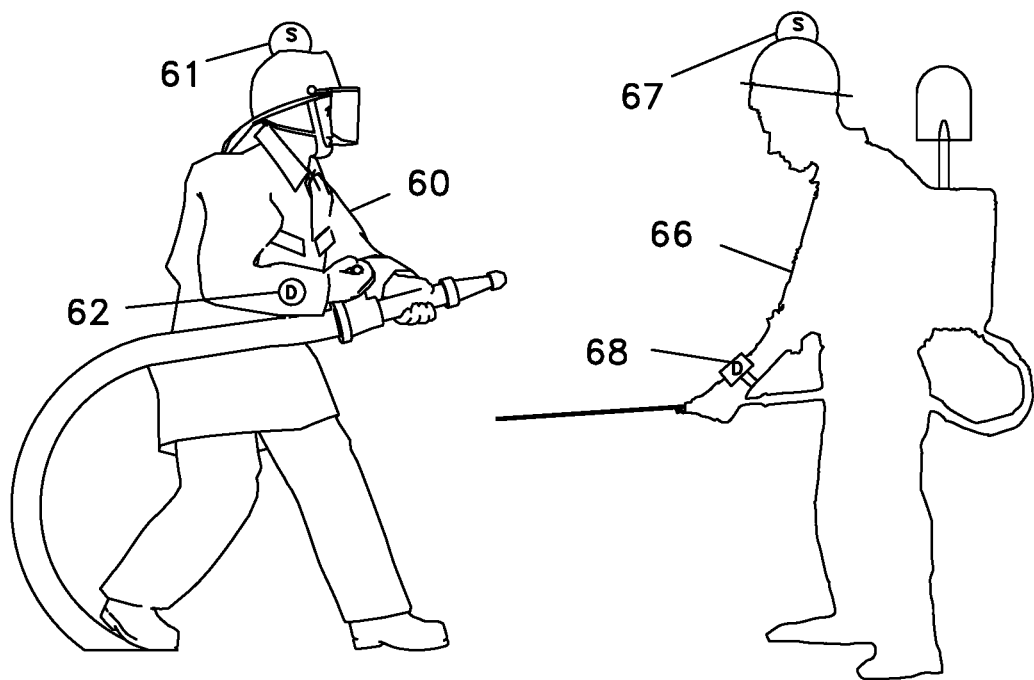
Figure 6:
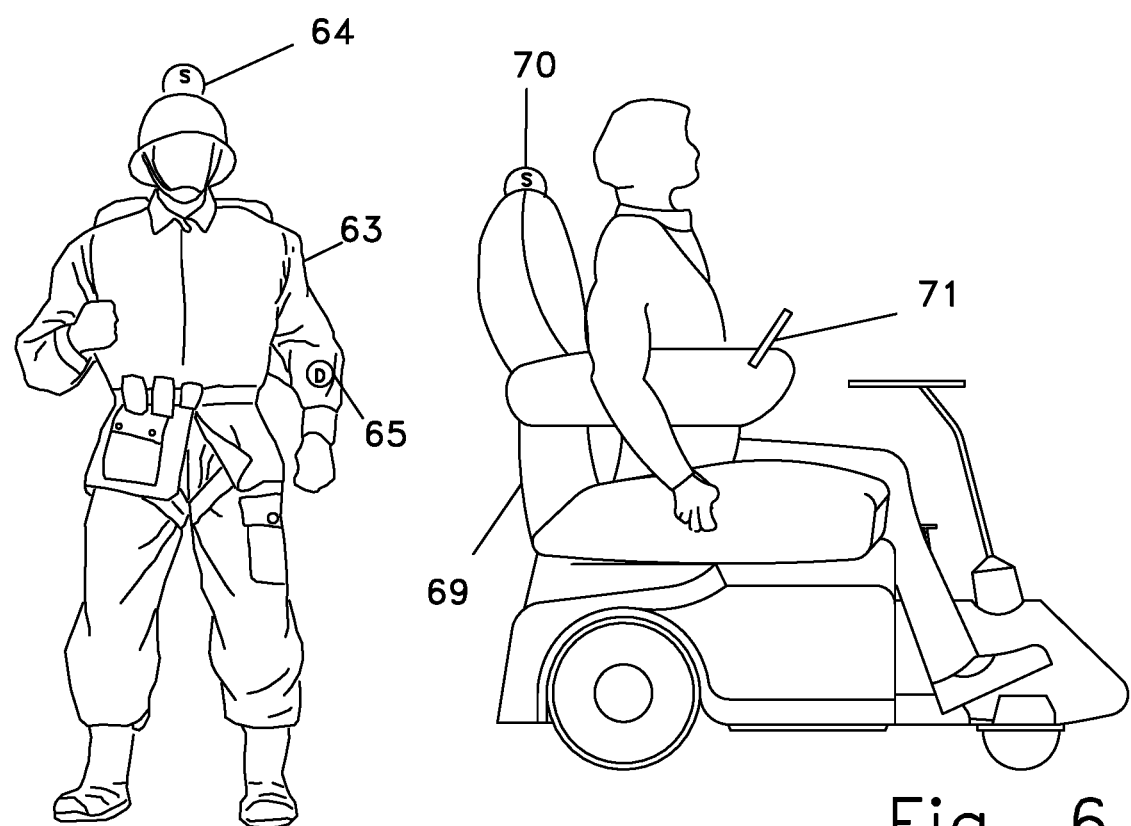

FIG. 6 shows an escape device as part of the equipment of various persons.

Figure 7:
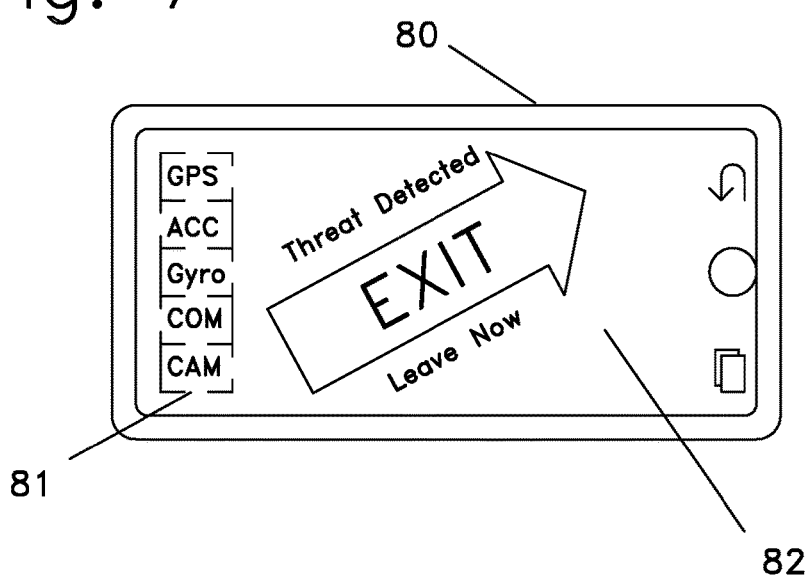

FIG. 7 shows an embodiment of an escape device in a smart phone.

Figure 8:
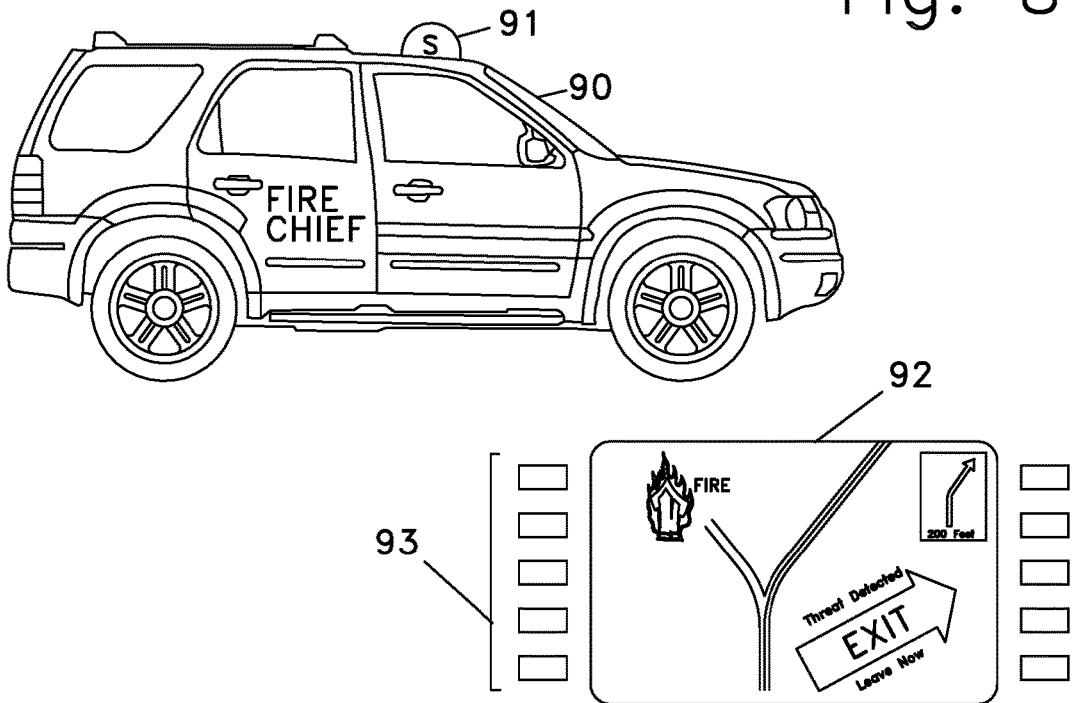

FIG. 8 shows an embodiment of an escape device in a vehicle.

Figure 9:
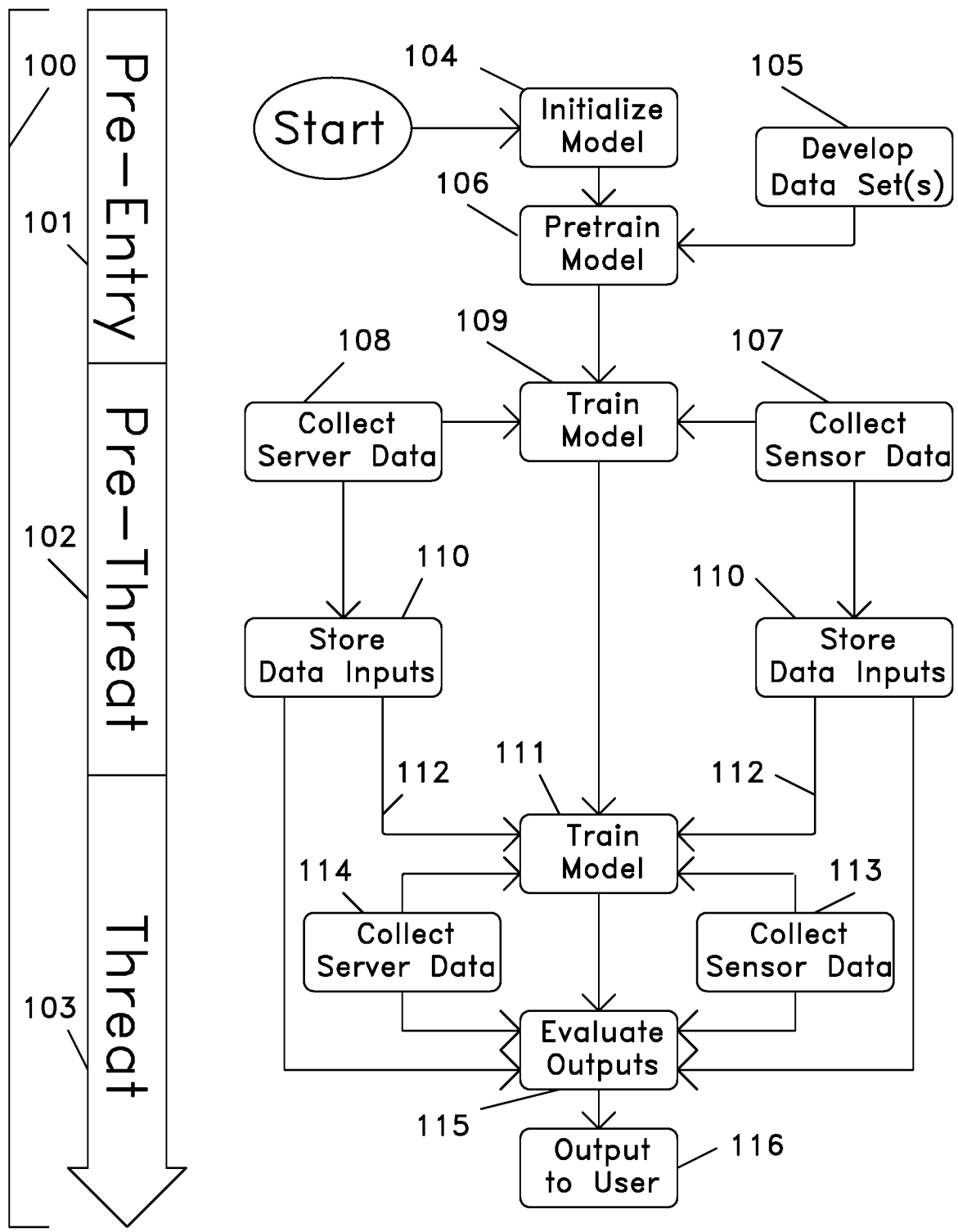

FIG. 9 shows the steps and structure of the basic information flow of the device and its training.

Figure 10:
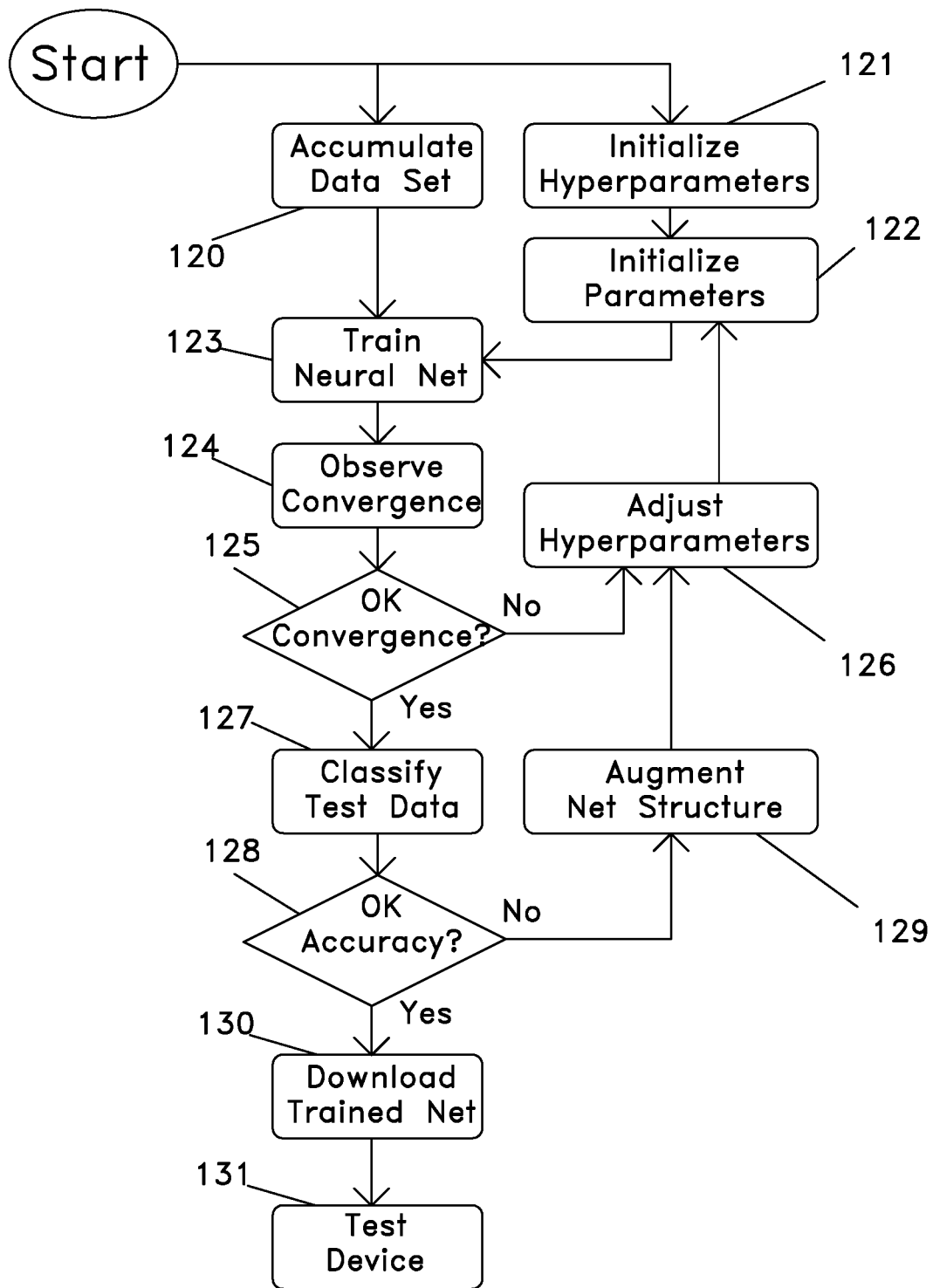

FIG. 10 shows a diagram for process of developing software for an escape device.

Figure 11:
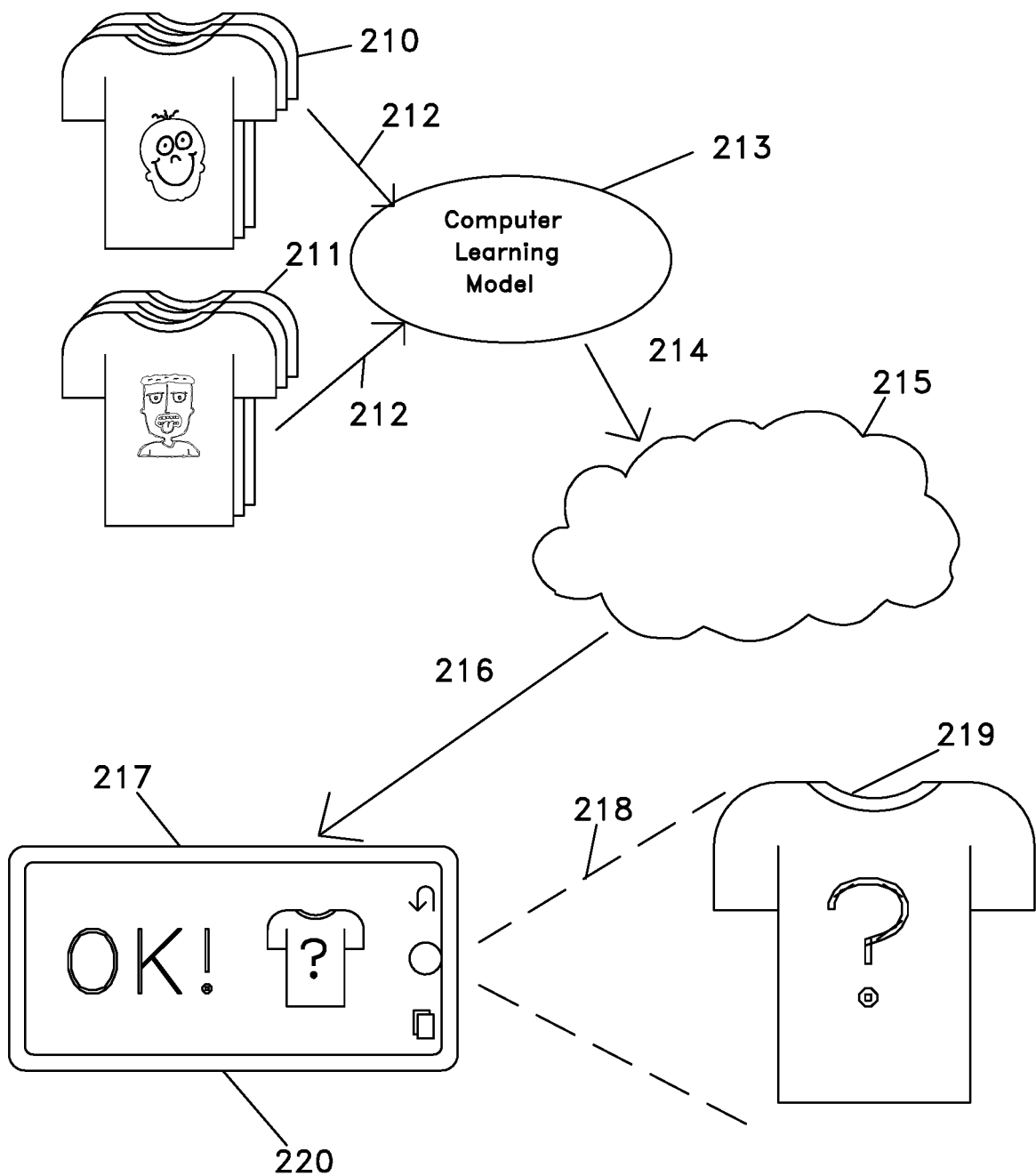

FIG. 11 shows a diagram of the operation of a system to determine compliance.

Figure 12:
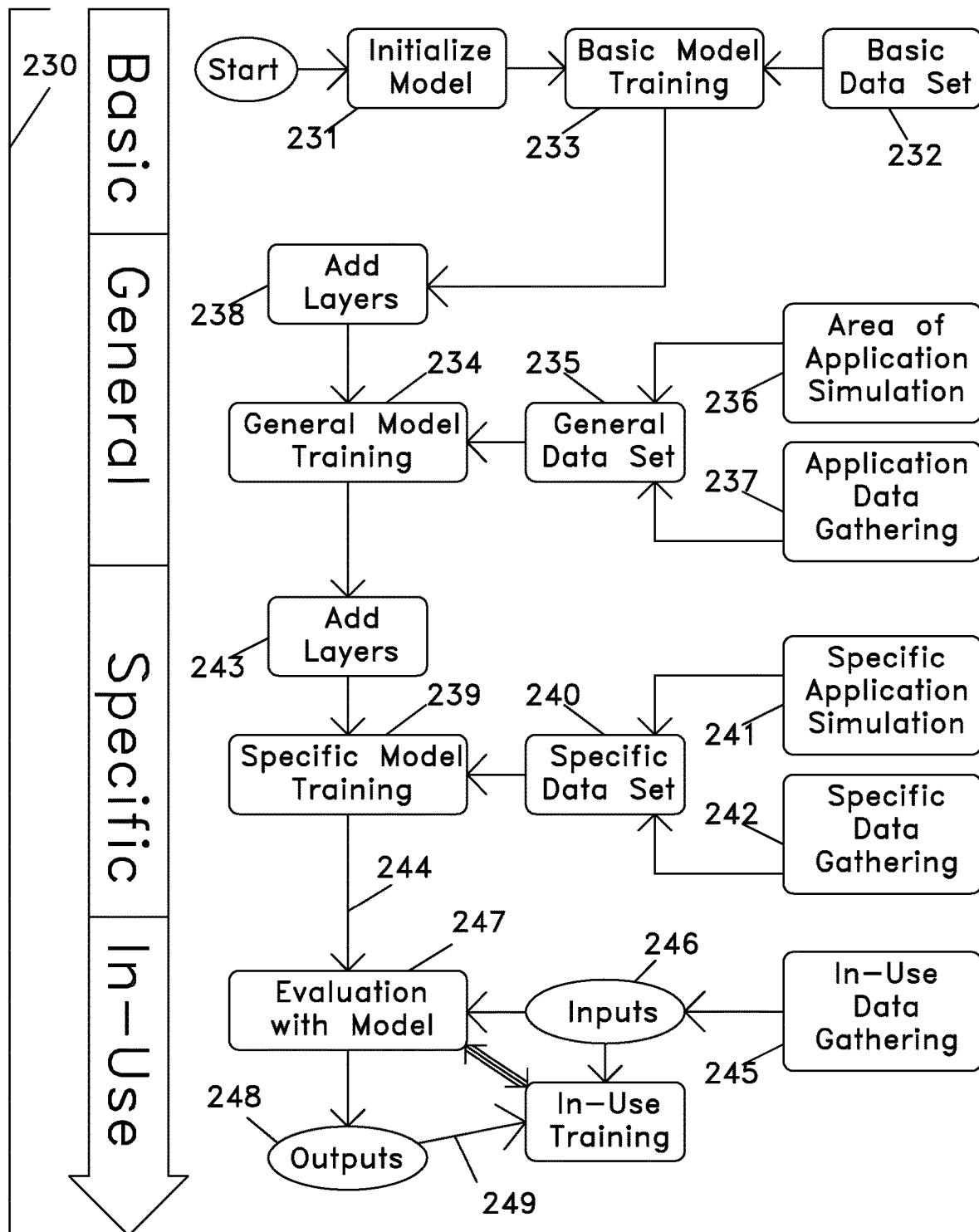

FIG. 12 shows the training and operation of a machine learning model for determining compliance.

Figure 13:
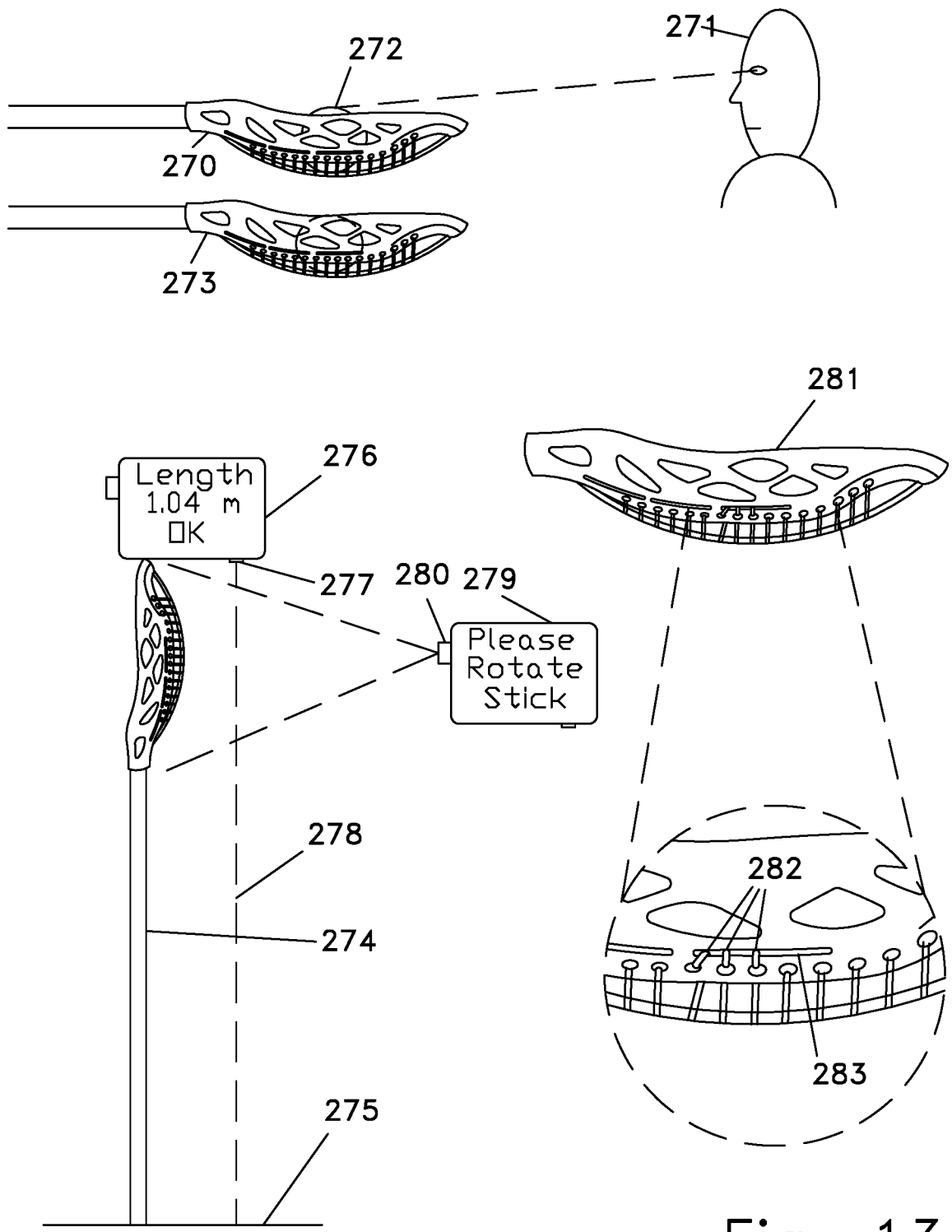

FIG. 13 shows an embodiment for judging compliance of a lacrosse stick with related game rules.

Figure 14:
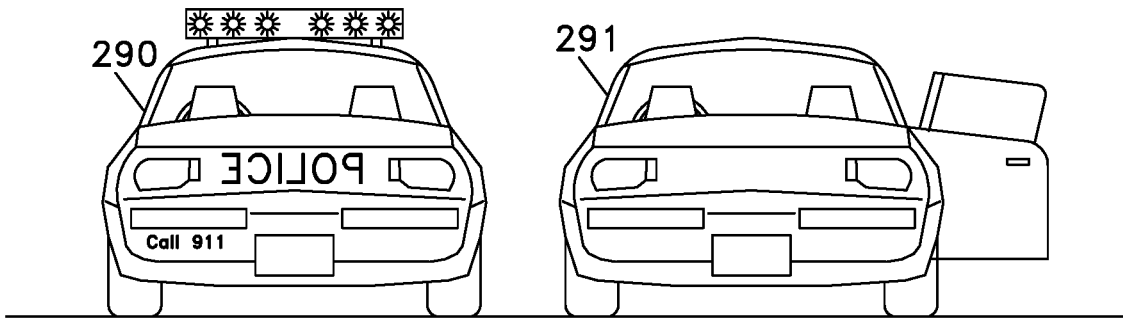

FIG. 14 shows a traffic stop where compliance with a "drunk driving" rule is being enforced.

Figure 15:
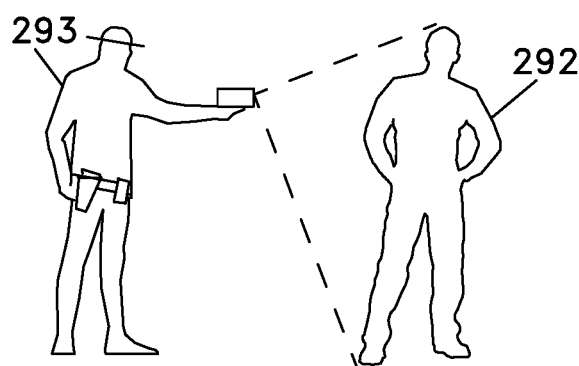

FIG. 15 shows an office using a device to scan a suspected drive in the stop of FIG. 14.

Figure 16:
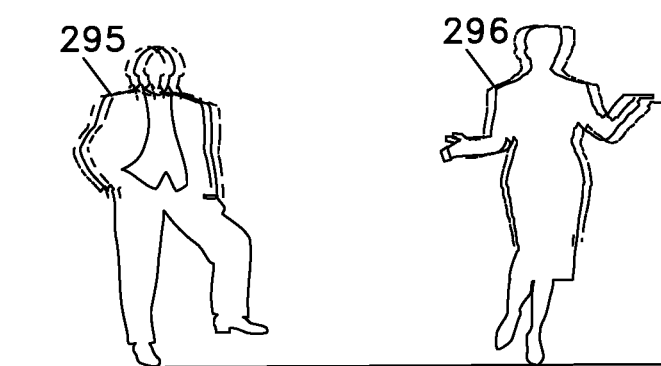

FIG. 16 shows two suspected persons being tested in the traffic stop.

Figure 17:
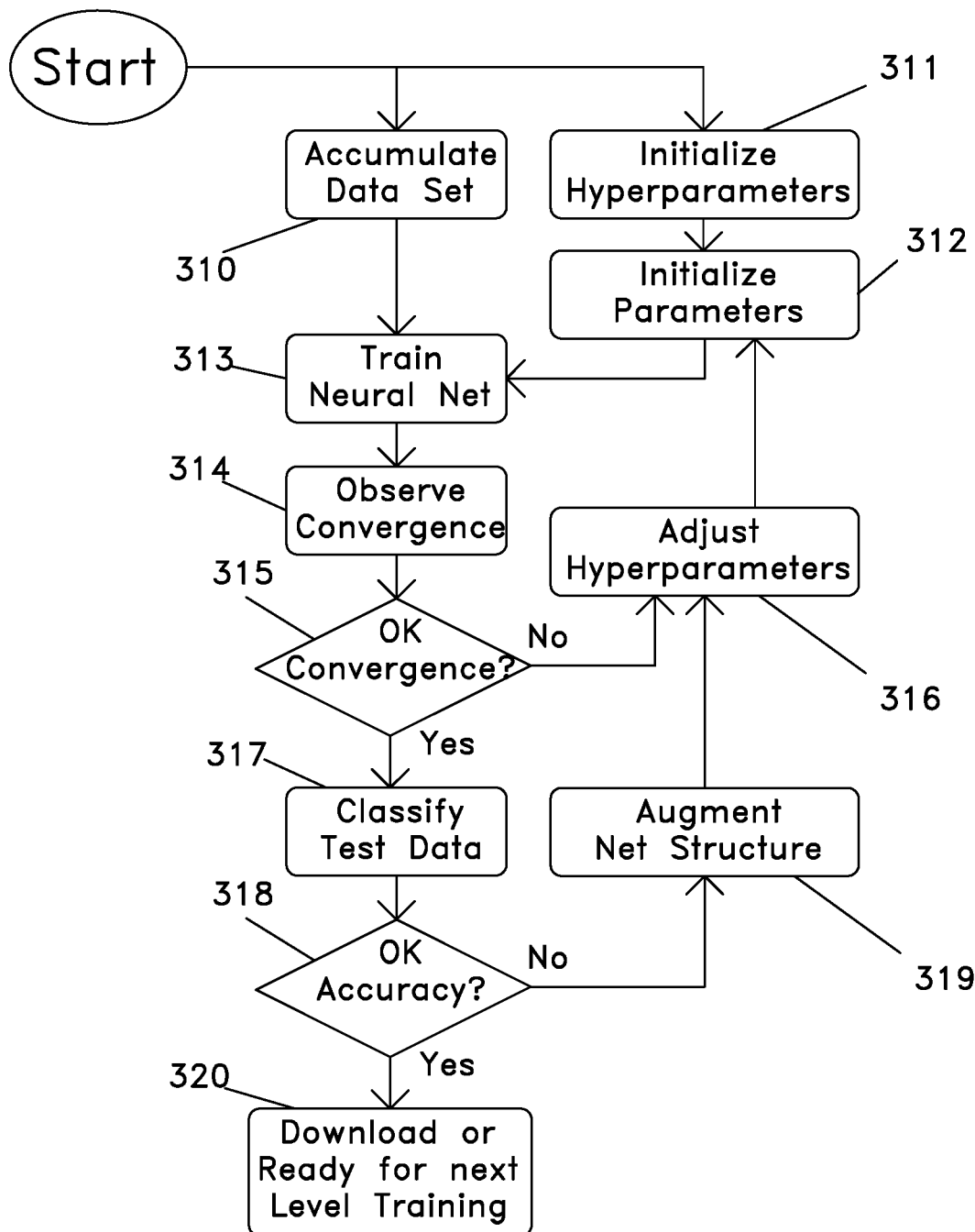

FIG. 17 is a diagram showing the training procedure for one level of a training process of a machine model.

DETAILED DESCRIPTION OF THE INVENTION

Detailed Description of the Invention of the PARENT application. This is also used by the CURRENT application but is not new material. The new material for the CURRENT application follows.

Escape Guiding Device

An escape guiding device, here usually called an escape device, is a portable device typically carried by a person entering a venue which collects information as the person enters and moves about the venue. If a threat occurs than the device provides guidance to allow the person to escape from the venue by a means or path that is calculated to allow the safest and quickest egress.

Typical Use in an Emergency Situation

A typical use is when a person has carried the device into a venue and allowed the device to continuously gather information which is used to train a computer learning system such as a neural net. When a threat such as a fire is detected by the device or the device is informed that a threat exist the device generates an escape plan with the model of the situation developed in the learning system. The steps of the plan are communicated to the person who uses them to escape.

Use by Persons with Limited Abilities

The escape device would be especially useful when carried by a person with special limitations on their abilities. For example, a person in a wheelchair who may or may not have the assistance of a second person to help move the wheelchair, could have the device especially developing an escape plan which is suitable for wheelchairs. This may take into account the restrictions or requirements on use of elevators during a fire or panic. Persons with sensory limitations such as blindness and deafness would also benefit from plans produced by the escape device which take into account their situation in relation to the situation in the venue.

The escape device when used by persons with limited abilities would in many embodiments have specialized display transducers. This would include audio outputs; speakers; vibrators; large, bright or flashing lights; and tactile devices. Another mode of use is by persons who use mobility assistance vehicles or modern motorized wheelchairs. The device can communicate with the chair at several levels from using resources of the chair as a display to complete autonomous control of the mobility device to carry the protected person from the endangered venue.

Limitation that affect egress may be sensory, cognitive or related to mobility. Similar considerations may apply to persons who do not have limited abilities but have responsibilities for other persons. This includes caretakers for elderly persons and for infants or small children. It would be necessary, for example, to make a special escape plan for a person who has a very wide baby stroller with triplet infants. Other factors would affect escape plans for devices where the protected person is a child. A child may not be able to compete with a panicked crowd of adults in pushing for a narrow exit.

Professional Use by Rescuers and First Responders

There are several professions where persons as part of their jobs enter into venues with high risks. These include firefighters and other first responders, the military in various operations, nuclear reactor emergency personnel and many other kinds. They can operate in area where conditions change quickly and information on current conditions may be hard to come by.

Venues

The escape device is envisioned as operating in an area called a venue in this specification and in the Claims. A venue here is an area which is sufficiently large to allow the assumption that if a person escapes from the area then that person is safe from an anticipated threat. The most common and typical venue is a building, but for some types of threats the venue may be limited to the portion of a building that accommodates a specific activity or some other area which contains hazardous zone. The extent of the venue is the area where the actual or anticipated threat is potentially operative.

Outdoor Venues

Some threats occur in an outdoor area. For example, a forest fire is a threat that is serious to people in certain situations such as to people fighting that fire. The venue in this case is the area that is threatened by the fire. Other outdoor venues include dangerous neighborhoods, battlefields, and flood plains. The venue is defined by the range and nature of the threat. Another example is in a situation where a car has broken down in a limited access highway intersection. This is an area dangerous to pedestrians and an the venue extends until an area safe for pedestrians is reached.

Special Venues

In one series of embodiments an escape device can be used to escape from the cabin of a passenger aircraft after that aircraft has crashed. On entry to the aircraft the device determines the seat that the protected person is occupying and consults a contained or downloaded database of aircraft layouts to determine the best escape path. Accelerometer and gyroscope sensors can evaluate the nature of the crash and with clues from a camera a reasonable escape path and procedure can be generated.

Another important type of venue is an area where industrial or other technical operations is being performed. When things are going wrong escape from a chemical plant, a reactor site, a ship, or a crime scene may be in order. An escape guiding device is useful in such situation, especially if the protected person is not familiar with the specific location or type of venue.

Threats.

The types of threats that may occasion the need to escape from a venue vary with the nature of the venue; but there are many different kinds in each class of venue that may require such action.

The most well-known threat is fire. Fire can occur in buildings and trap people by blocking exits and creating situations where exit by the standard route or the entry route is impossible or inadvisable. Fire creates a lot of physical clues such as sounds, heat and smoke; but it can also be hidden. Subtle use of sensors and information from servers may be necessary to assess the extent of danger and to create a workable plan to escape the threat or the venue.

With respect to buildings, explosion and collapse are related to fire because the original cause may be a fire. These events are usually sudden, and an escape device is faced with the problem of evaluating data to determine what happened, where it happened and what limitations have been created for an escape plan. In such situations, it is useful to have access to data from servers concerning the details of the venue. Such data may be currently accessed or accessed prior to entry to the venue. It may be used to pre-train the computer learning model allowing additional training from new data concerning the threat event to allow generation of an escape plan.

Wildfire which is commonly referred to as forest fire in certain cases also provides a threat that requires a sophisticated escape. There have been several cases where firefighters in rugged terrain have been suddenly overtaken by flames sometimes with tragic outcomes. In many cases, local sensors would be unable to detect the threat coming; but with server input concerning the threat a computer learning system can combine that information with local sensor data concerning current location and conditions observed in the venue to generate a reasonable path. Such escapes sometimes need to be very quick and continuous computer monitoring of the situation with continuous training of a model would often be needed.

Terrorism and the related possibility of attach by hostile persons for other reasons has become a wide concern. Local sensor data concerning such events as sounds of gunfire, crowd noises and audible instructions from venue staff or other persons can be combined with venue layout and location information in forming a plan.

The listed threats, other causes, and events caused by the dynamics of otherwise unthreatening situations can cause panic. Panic itself can be a danger and threat that exceeds the importance of its original cause. Stampeding crowds have caused many injuries and fatalities. An escape device should in its basic levels of training take into account these possibilities and design escape plans which avoid particular crowd dangers. These include narrow restrictions and culde-sacs which threaten a protected person with being suffocated or crushed by crowd pressure.

The threats listed above contain obvious serious dangers to persons; but there are other threats which seem less serious but in certain cases may be important. Nursing home residents, prisoners and other persons with limited abilities to help themselves can be seriously threatened with loss of resources. These threats include loss of power and light, being locked in, loss of elevator service as well as other problems. Even when staff or other personnel are available to help with the situation, the nature of the difficulty or the number of persons threatened may be overwhelming. For example, elevators and building lighting are in most cases backed up by local generators in the event of a power supply outage. Unfortunately, generators often disclose their inoperability only after they are needed. An escape from a high floor in an unlighted stairwell is very difficult. Even if most threatened persons can "shelter in place" it may be necessary to send someone for help or needed supplies.

Escape

Escape from a venue under threat means to move away from the venue to a place where the threat is no longer a danger. Escape from a threat in a venue means to either move away from the operative area of the threat or to take action which renders the threat inoperative. The person carrying the escape device could be a leader of a group and could be charged with leading the entire group to safety.

A key function of an escape device is to form an escape plan. An escape plan can include a path to travel, conditions to be check for which would modify the plan, and conditional actions in the event of determination of necessary conditions. An example plan could be expressed in words as "travel back to the entrance, but if it's blocked by a crowd go to the side door." The sensors in the device inform the model which would in effect watch for signs of a crowd and redirect movement to the side door if they are found. The plan may contain routes or paths to escape from the specific venue which comprise locations and directions to facilitate movement away from the hazard or venue.

While the entire plan could be made available to a person using the device, in most cases the device would display or convey to the user the next step to take in escape. Keeping the presentation simple may be very important in a sudden threat situation.

Sensors

The escape guiding device can employ information from a variety of types of sensors. These include video or picture cameras, accelerometers and gyroscopes, GPS receivers, receivers for transmissions from remote sensors, threat sensors not a part of the device. The term sensor as used in this specification and in the claims, includes not only sensors that are part of the device but also receivers that collect currently sensed information and are provided by the venue or third parties. It also includes a GPS receiver where the receiver generates location information from timing details of the received GPS signals.

Cameras

A camera either still or video can gather information. Machine vision software is now available which will recognize situations and objects and can provide a critical input to a computer learning system. Such learning systems often work in several layers and provide learning at a high level in a manner using generic detail recognizing systems at a lower level.

Accelerometers and Gyros can be used to detect movements of the device or the person carrying the device. In the phase prior to detection of a threat, such information can be correlated with venue layout, GPS and other information to give a more detailed picture of the entry path. Slowdowns, halts, and diversions on entry may or may not be clues to potential difficulties on egress. That may be determined by correlation with other information. In the escape phase after a threat is detected other movement events are important information. Slowdown, halts and diversions as even more important here. Other events such as a person falling or being knocked down can be detected and taken into account. The rate of movement and details such whether the movement of the person escaping are important Microphones Microphones can be used to detect conditions around the escape guiding device in several ways. If multiple microphones are in use and have directional sensitivity that can be correlated with directional information from sensors.

One category of useful sounds are those made by other persons in the venue can give important clues to the movements of persons, to the number of persons in various area and the experiences that persons are having. It may be possible by using analysis of the sounds of persons to detect potential escape routes which are blocked or where panics are occurring.

Another category of useful sounds are those made by the threat itself. Fires and gunshots as well as the panicked crowds mentioned above have characteristic sounds which are subject to analysis.

A third category of useful sounds are announcements and other information given by the venue operators. Sensitive microphones and analytic software can interpret these sounds where they would be covered up by other ambient sounds as they are heard by persons.

Miscellaneous Sensors

Other types of sensors which may be useful include magnetometers which can give an absolute direction from the earth's magnetic field in certain cases and thermometers which can detect heat from threats and changes of temperature from outside area in cold weather.

Output Device.

The term "output device" is used in this specification and in the claims rather than simply "display" to convey that the output of warning and guidance for the protected person may be in modes other than the common visual screen. Especially with persons of limited abilities and for most persons in difficult environments, a visual screen may not be the best way to convey the needed information in a way to get timely escape action. Some output devices work by conveying information to a person and some by conveying information to equipment such as an autonomous vehicle which acts on an escape plan.

Some output devices are visual. They can be general display screens which can show pictures and text and provide detailed instructions. These can be integrated with input devices such as touch screens. Other visual output devices include lights which can be flashing to get attention and mechanical devices which raise flags.

Some output devices are audible. This includes speakers and earphones as well as sirens which may be operated over a communication link.

Tactile output devices include vibrators, braille devices and specialized devices which operate mechanical signifiers.

The escape device can operate vehicles as the primary or an additional output mode. In other cases, the escape device can operate elevators, doors, open gates and substitute for a key or pass code to allow exit.

Beacons

Beacons can be placed in the device by the venue operator. The beacons can operate by radio, infrared or other communication means. An ordinary Exit sign is in effect a beacon. Such signs may incorporate beacons that operate in other modes for use with escape devices. More sophisticated venues may come to offer services with venue information at their locations. In the future, digital escape information may come to be required as an extension of the services for direct communication to humans. Current flashing fire warnings, sirens, buzzers, exit signs etc. may have digital equivalents and augmentation. An intelligent escape device would take advantage of such information as much as possible.

Processor, Machine Learning and Models

A device to use gathered information to guide a person from a venue where a serious hazard exists requires very sophisticated computer system to complex problems in interpreting incoming data and generating a plan for escape. In general, it is not feasible to discover all of the rules and relationships necessary to solve that problem and to write a determinative computer program that produces a sufficient result. However, methods have been developed and are wide and increasing to use a set of examples which is processed and used to product a set of rules which working together can find answers suggested by the examples. A substantial set of examples and a large amount of processing are required but many people are trained and are being trained in application of well known methods to implement this approach on a wide variety of problems.

There are limitations on the kind of problems that can be solved with this approach, but the problem here is well suited for the approach because of the specific input data that is to be gathered and because of the specific kind of output that is required.

Machine learning as used here and in the Claims is a term for the type of artificial intelligence that is implemented without explicit programming to generate solutions to the problems confronted. It is focused on the development of solutions by having the effective program change as it incorporates data in such a way that it converges on an ability to produce the required solution.

Model

The term model as used in this specification includes representations that do not explicitly describe the system modeled but which are designed or trained to produce information based on the behavior of the system. It includes pattern matching system such as a neural network which has been trained on data exemplifying the system. In that case the model consists of a, probably huge, array of parameters that determine the operation of the individual neurons in the neural net program. Training would work by systematically adjusting the values of these parameters on the basis of the training data.

Detailed Description of the Current Invention

Standards

A standard as used in this specification and claims is a specification of a condition on which the granting of a privilege is conditioned. The standard can be expressed in words directly defining it or in a procedure which results in a decision determining whether or not the condition warrents the granting of the privilege. The procedure can be defined in words or by means of a device which evaluates the condition.

Physical Standards

A "physical standard" as used in this specification and claims is a standard which depends on the existence of physical attributes which can be evaluated, possibly in the context of non-physical attributes, to determine compliance with the physical standard. Examples include the presence of a necktie or other class of object, size of an object, and the presence of certain text. Physical standards are not necessarily based on static attributes but can be based on upon actions produced by physical objects or physical actions of persons. These actions may be conditional on certain stimulations or environments.

This specification disavows the full scope of the term "physical standard" by excluding physical standards which consist wholly or primarily of identification of a specific person or object. This limitation is intended to invoke the decision of *Sci Med Life Sys., Inc. v. Advanced Cardiovascular Sys., Inc.*, 242 F.3d 1337, 1341 (Fed. Cir. 2001) ("Where the specification makes clear that the invention does not include a particular feature, that feature is deemed to be outside the reach of the claims of the patent, even though the language of the claims, read without reference to the specification, might be considered broad enough to encompass the feature in question.") Therefore, a physical standard that consists of requiring any person with certain characteristics or a license tag from a certain jurisdiction on a vehicle be present would be included in the definition; but, a physical standard that requires only that a specific person or a specific license tag number be present would not. A standard may comprise a portion that constitutes a physical standard in conjunction with a portion which is non-physical or which is excluded above as a specific identification.

Compliance with Physical Standards

Because it is generally impossible to implement rules sufficiently detailed to determine compliance with any set of rules in specific cases, a decision mechanism is necessary to apply rules. If the decision mechanism is automatic and based on a program containing a more extensive system of rules than that the published rules, it too is likely to have situations which are not decidable. Such systems are common. Systems based on human judgement range from the decisions made by "bouncers" at the door to nightclubs to the U.S. Supreme Court. Unfortunately, these systems typically do not allow persons wanting to determine in advance what to have or do to be in compliance. Irreversible actions to achieve compliance may fail with the failure only determined at the last minute. Systems based on human judgement are also subject to variation from decision to decision and from judge to judge due to unavoidable variations in human behavior.

Physical Attributes

Compliance with standards is determined on the basis of information available to the decider. There are several distinct classes of information used for this purpose including information from records, information testified to by a witness, declarations of fact from an applicant, declarations of intentions and physical attributes of a person or object relevant to the standard to be applied.

Physical attributes are those that are evaluated in a particular object or person at a specific time. For example, the current length of a person's hair or beard is a physical attribute. A camera or video image of a document is a physical attribute of that specific copy of the document, but the validity, uniqueness or meaning of the document is not in itself a physical attribute.

Testing of Compliance by Evaluation of Physical Attributes

In many cases standards can be expressed by requiring some state of a physical attribute. For another example a nightclub can express its standard aimed at insuring that all customers are of legal age to buy alcohol by requiring that they have a governmental document with a picture certifying the age. This would be a document such as a driver's license. The physical evaluation to test compliance would be to compare the picture to the person seeking entrance. Human comparison of pictures with actual persons is very slow and unreliable. The comparing person is likely to be distracted by irrelevant characteristics such as hair style and eyeglass designs. A substantial proportion of people have a condition, called prosopagnosia or face blindness which interferes with processing of visual data concerning faces. A person seeking admission risks embarrassing rejection at the same time the venue risks admitting improper persons.

Another example can be seen in a requirement that a vehicle tag renewal sticker be attached in a specified manner, such a being right side up and in a specified place on the license tag. This could be tested by an application downloaded on a user's personal device (cell phone) which would evaluate a picture of the installation, giving the user confidence that the installation is correct.

Machine Learning

Machine learning is a well-developed and understood method of creating devices that are capable of solving problems that defy development of programmatic solutions that rely on understanding in detail the working of the system to be analyzed. A famous example is the modern language translation systems widely used on personal computing devices. Development of programs to translate languages has produced poor results because of the complex and subtle structure of human languages and the scale of the problem. But systems have been developed to be trained on a large (possibly hundreds of millions) number of examples of language usage. The trained models are then applied to an input in one language and provide output which is very likely to be a satisfactory translation in another language of that input.

Machine learning systems are very different from computers running programs written to model problems to be solved. While the implementation of a machine learning system may be made by means of a computer program, this is not the only way to implement machine learning models. An array of analog devices (usually called gates) can implement the model in a massively parallel way. Rather than containing a program, a machine learning system constructs a model which transforms an input through a huge number of gates to produce an output which has a statistical meaning. The operation of the gates is modified in the training steps until the behavior of the model converges on a tendency to produce desired results.

Machine Learning System Models

A machine learning system model or just "model" as used in this specification and in the claims is a large set of parameters represented as data or physically and arranged in such a way that they can be adjusted by a training process based on a collection of data that represents the system being modeled. The model also allows inputs that represent a particular state or set of states of the system to be analyzed by use of the model. The use of the model transforms the inputs into a set of outputs that constitute an analysis of the states being analyzed.

A model can be applied to a set inputs by means of an algorithm executed by a processor or by means of a physical analog device to perform the transformation. The algorithm or device is only the means of evaluation and is distinct from the model which is the set of trained parameters and the structure in which they interact.

Model of an Area of Application of a Standard

The model being trained can be trained using data from examples which are demonstrative of compliant and non-compliant situations, objects and behaviors which are more general in scope that the particular case to be examined in a final evaluation of the model. This produces a model of an area of application of a standard more general than one which is trained to a specific context. This would typically be done on larger processors without real time constraints prior to downloading the model to a device for use in specific contexts.

Training a Model

In this specification and in the claims the process of training a model consists of applying data representing possible inputs to the machine learning system with the model in its current state of possibly partial training. The outputs of the system are used to generate incremental adjustments to improve the transformation of the inputs into outputs better representing the desired behavior of the system.

The usual way to determine the adjustment to be made to the model for each group of inputs presented is to calculate or measure the effect on the outputs of each parameter in application of that set of inputs. If the effect is favorable in providing outputs that correspond as wanted to the inputs then the parameter is very slightly augmented to improve the overall behavior of the model as trained.

There are many ways to accumulate the data sets used for training. One way is to find or set up a large number of examples with known outcomes and collect the data from them. Another way is to write an algorithm which generates examples. The examples can be graded by people or the generation method may be able to predict the outcomes. Some problems are easy to solve in reverse; i.e. a set of inputs may be easier to get from a assumed output than to find the output from a set of inputs. For example, to train a system to distinguish pictures of dogs from pictures of cats one can get pictures from public sources such as the internet and use humans to label the species depicted. That set can be used to train a model which can test other pictures.

Convergence

The training process is continued for each item in the training set data. Because it is important that training result in a stable and gradual progression of the model toward the desired behavior teach round which uses the set of training data items only changes the model by a small increment. The rounds are repeated many times and the results are compared to data reserved for testing in order to measure the effectiveness of training. If the structure of the model is well chosen than parameters will converge on values that produce the desired outputs for various input sets.

Training in Levels

Models can be arranged in levels both for training and for evaluation of inputs. The application of the model to a set of inputs generates outputs that describe in a higher level of generality the meaning of the inputs. Those outputs can become inputs to further structure which is a model for a more general transformation of the original inputs toward meaningful outputs.

In this specification and in the claims, a level of training is the training of a portion of the parameters of a model to produce outputs that are trained until a state of convergence is attained and made available for input the next portion of the model. That is, distinct levels are made distinct by separate training to convergence. It is possible to simultaneously train multiple levels, but they are distinct levels when they are separately tested for convergence. A level that is not tested for convergence but which uses inputs from a level that has been brought to convergence is a distinct level from the level providing the inputs.

Typical models are in at least four levels. The first which here is called the Basic level takes raw sensor input and describes it in terms directly definable based on the input data. Examples would be detection of edges from visual data and of tones, harmonics and burst timings for audible data. The second level which is here called the General level is to identify objects and events from the output of the first level. Examples would be to detect a person crossing the path of the sensor or identifying a sound as a gunshot or crowd noise. The third level, herein called the Specific level is to allow the model to identify actions and objects appropriate to the purpose of use of the model. Examples of this level include model layers to implement steering or acceleration of a vehicle or determination of compliance with a standard in a specific type of situation. There is also a fourth level called the In-Use level in many implementations. This level incorporates data collected while a model is in use which modifies the model to allow evaluations at a later time to take into account earlier inputs or evaluations where a series of evaluations is made.

Implementation of Training on a Processor with a Memory

Training requires a very large amount of processing to apply the large amount of data in the training set repeatedly to incrementally cause the model to converge on the desired behavior. If the adjustments from one pass through the data are too large, then the model may not converge or may not allow the effects of all of the inputs to diffuse through the model structure and correctly operate. For this reason, specialized very powerful processors are used for training. They are not appropriate for incorporation in portable devices because of considerations of size and expense.

Basic Training

In this specification and in the claims, basic training refers to training which is used to interpret inputs from sensors or raw data from data sources to identify aspects of objects and actions treated as objects that are implied by the data and too general in nature to identify the potentially detected objects at this stage. Examples include edge detection, categorization of sounds by location of the source, face detection, orientation in space, counting objects, elimination of backgrounds and many other general tasks of interpretation.

A portion of a machine learning model with this training can be used for many applications and could be supplied by a specialized developer. It's training would be brought to convergence and the outputs supplied to the next level of training when the model is used to evaluate inputs either for further training of other levels or in actual use.

Data for General Training Describing the Area of Application of a Model

Data for the general level of training can be acquired by collecting a number of real examples or by generating examples with a program to produce examples and training data. In this and in other levels, it is often much easier to produce a program for generating examples for machine learning than to determine specific rules to allow determinative non-learning algorithms for evaluating rules designed for human understanding.

Data for Training Concerning Compliance with a Standard

There is often available a set of examples to be made into training data from prior application of a rule set. For example, a dress code model could be made by using video collected over a period of time of people entering a venue. The videos could be graded by whether persons are admitted or turned away by entry personnel. This would allow automatic generation of a training set by processing the videos.

Transferring a Trained Model

Levels of training of a machine learning model can be divided into two classes. The first class is those levels that require very large amounts of processing power and time to train. These typically use large training sets and are done before other levels. They include in most cases the basic training levels which are concerned into extracting interesting features from raw data usually from sensors and the general training levels which concern coordination of features in sets of circumstances which are designed to encompass the specific situation to be evaluated. These levels cannot be conveniently handled in real time and on a processor convenient to take into the field to perform evaluations.

The second class of levels are those that must be performed after the specific situation to be evaluated is determined. They must be performed in real time and on processors available at that time. The model trained by the first class of levels can be transferred to a more convenient processor for the second class of levels of training.

Data for Testing Compliance with a Standard

After a model is trained in several levels and downloaded to a processor to use the model to evaluate situations, data must be collected with an appropriate sensor. The data is provided to the processer as input to the model for an evaluation to produce outputs. The outputs may have further non-machine learning processing to produce a determination of compliance with the testing physical standard.

Acquisition of Testing Data with a Sensor

A portion of the data collected or generated at each level is reserved for testing. This data is not used for training to enable testing the model without concern that the model might be effect only with the specific cases used for training.

Determination of Compliance

Once the model is trained through all relevant levels, it is used to evaluate a situation to be tested for the state of compliance. Data is collected by use of sensors, servers or other sources and supplied as an input to the machine learning model. Processing the input through the process defined by the model generates outputs. These outputs are used to determine compliance.

DETAILED DESCRIPTION OF THE SEVERAL VIEWS OF THE DRAWING

Referring to FIG. 1:

A person 10 to be protected is entering into a venue at an entrance 11 carrying an escape device 12. The device gathers information as the venue is entered and the person progresses through the venue along path 13. The device gathers information from sensors which may include an optical camera(s) with a field of view 14 and self contained sensors such as an accelerometer or gyroscope. A beacon(s) 15 in the venue may provide additional information to the device with a suitable signal 16. The device both before and after entering the venue may receive signals 17 from the outside servers which provide various kinds of information such as location (gps), venue layout, pre-calculated paths and parts of paths and many other kinds of useful data. All or portions of the calculation burden may be offloaded to external servers. The protected person proceed along the path which may contain various possible areas 18 where on return false turns may be taken or additional dangers may exist. The inner parts of the venue are the destination and the activities for which the person has come take place 19.

Referring to FIG. 2:

The person 10 from FIG. 1 is in the inner part of the venue with the escape device 12 when a threat 20 appears. The threat depicted is a fire which has broken out. A large number of other people have entered the venue. If the venue is full of panicked people as depicted (numbers are omitted for clarity) and the lighting has failed, efficient escape may be difficult. In many cases the best escape is not back through the entrance path, but in the depicted case that path has been chosen by the device and is shown as 13. Two cull-de-sac's 18 are shown. They may not have been noticed by the protected person on the way in; but they are each holding a crowd of people who think that is the way out. Without the help of the escape device, the protected person may choose to join the people trying unsuccessfully to force an impossible exit.

Referring to FIG. 3:

A front view of one embodiment of an escape device is shown. The depicted device is designed to be worn on a chain, ribbon or lanyard around the neck of a protected person with a provided eye 30 for attachment. The central area 31 of the device is a display screen which gives instructions in case of a detected hazard and shows a decorative screensaver chosen by the user at other times. A camera 32 is used to gather information on entry to the venue as the device hangs around the protected person's neck. Eight sound ports 33 lead to microphones which gather audio information to be analyzed for content, timing and arrival direction. A fringe 34 around the device is for decoration and to help distinguish the two sides of the device. As depicted the device is showing the detection of a threat 35 and is beginning the process of guiding the protected person from the venue with exit directional information 36. The screensaver decorative display has been replaced with a warning.

Referring to FIG. 4:

The back of the device is shown. It is cut away as necessary to show interior components. A speaker 40 is included to alert the user. Various input and sensors are shown including an accelerometer 41, a gyroscope 42, a GPS receiver 43 and a communication device 44. The communication device can be used for many purposes such as receiving beacons from the venue, information about the venue from an outside server, access to outside processing assistance from a server or download of pre-trained parts of a pattern recognition or neural network for the device. Use of the outside servers allows function with a reasonable processing load on the devices own processor 45.

Referring to FIG. 5:

A venue is depicted where the escape device is adapted for escape from an aircraft cabin 50. The protected person enters from the normal cabin door 51 along path 52. The protected person arrives at assigned seat 53. The device integrates information downloaded from servers such as the persons assigned seat, the layout of the particular aircraft for this flight, the anticipated number of passengers and the scheduled times of the flight. This information is used in combination with information gathered by the sensors as the protected person enters the aircraft and after a hazard is detected. If a hazard situation is detected the escape device evaluates all available information and plots an escape route. In the instant situation, the escape route 54 is not toward the entrance door but is in the other direction to the exit aisle 56 which leads to an emergency exit 56.

Referring to FIG. 6:

The inclusion of an escape device in the equipment of persons in various roles is shown. The device is designed to be able to access servers and the environment with sensors and communication device, perform it's analytical role and provide escape information to the user. It may also be integrated into other equipment associated with the protected persons role both for purposes of gathering information and for outputting escape paths.

One situation where integrating an escape device into a person's daily equipment is in the case of a firefighter 60. The device could have sensors 61 and a display and warning device 62. In this case it would be helpful to provide specialized sensors such as infrared heat detectors. If the firefighter comes to a closed door with intense fire on the other side, it is dangerous to open that door. Firefighters are so trained, but forgetting this critical rule is a source of many injuries. If the firefighter is attempting to escape other critical dangers, the chance of making such a mistake is multiplied. Heat sensors in the escape device could warn the firefighter not to take that route and the device could suggest another escape plan.

Another situation is that of a military person 63 or soldier. Many battlefield conditions can affect the choice of a suitable escape route from a dangerous area. Directional sound detectors in a sensor module 64 would be useful in detecting area with friendly or hostile occupants or active use of weapons. Taking these factors into account a computer learning system would be able to estimate an appropriate route for accessing a safer area such as in returning to ones unit. Directions could be displayed in a small display unit using an appropriate sensory mode 65.

A forest firefighter is shown at 66. In this case the protected person is using a water pack to put out a small fire separated from the main area of threat. Heat sensors as part of a sensor package 67 would be useful to detect the approach of active burning and may save a person in danger of being surprised. In particular, continuous planning of an escape route can cause a danger of being cutoff to be detected before the actual threat approaches. Again, a display and warning device is used 68.

A mobility chair or motorized wheelchair is shown at 69. The sensor unit 70 gathers information from servers and sensors. In the event of a threat after a plan is developed appropriate instructions are display on a display 71. In some cases outputs from the escape device are used to direct the chair controls to make the escape or facilitate the needed movements. For example, the chair may have built in limitations of speed and other parameters that can be overridden.

Referring to FIG. 7:

An embodiment of an escape device in a smart phone 80 is shown. Typical smartphones have many relevant sensors 81, substantial processing power and visual, audible and vibratory output devices 82. With suitable software embodying a learning model of venues an escape device can be implemented as an application in a smartphone.

Referring to FIG. 8:

An embodiment of an escape device integrated into a vehicle 90 is shown. The escape device uses a sensor and communications module 91 mounted on top of the vehicle. When a threat is detected the plan developed by the escape device is displayed on the GPS display 92 integrated into the vehicle. The input devices for the vehicle GPS 93 are also used to enter parameters for the escape module. In this way the vehicle user can instruct the escape device about servers and sources of information to be considered.

Referring to FIG. 9:

The steps and structure of the basic information flow of the device and its training are shown. There is a timeline 100 which is divided into three periods. First pre-entry 101 which is the time prior to use of the escape device to track entry and movements into a venue. The device is pre-trained during this time. The next time period is pre-threat 102, the time prior to detection of a threat which is used to train the escape device and store relevant conclusions. The final time period is the threat and escape period 103. During this time collection of data and training continue but evaluation of the model and development of escape plans and instructions also occurs. The instructions are put to the output display transducers to allow the protected person to escape the venue.

During the pre-entry period, the model comprised in the escape device is constructed and initialized to parameter values suitable to allow effective training 104. Pre-training 105 typically proceeds in two stages and uses two data sets. The first stage uses a generic data set and trains for general skills such as recognizing objects and edges from a camera sensor. The data set for this stage may not be one specifically developed for this application but is suitable to the sensors and processing resources to be used in the device. The second stage used a data set developed 105 specifically for this application which is based on real or virtual escape and venue analysis scenarios. Such data sets would find data concerning specific venue layouts and facilities and data concerning typical venues that can predict possible situations in actual venues to be especially relevant. The data sets are trained 106, usually sequentially, into the model. Low level training. such as here used, is computation intensive; but it can be accomplished on a one-time basis using substantial computing resources not needed by the final escape device. If the device is produced in mass quantities the pretraining results are loaded into each device in the process of production. Additional data sets and training can be done prior to use of the device to adapt it to specific anticipated uses or venues.

During the pre-threat period, the protected person takes the escape device into the venue. Sensors in the device collect 107 information about the venue and the protected person's location and progress. Information is also downloaded 108 from various servers and beacons provided by the venue or outside sources. The sensor and server information is used to do more venue specific training of the model. This can be accomplished by a processor in the escape device; but it may also be assisted by training resources located in servers away from the escape device. Sensor and server data can also be stored 110 to be used as an input in the later threat stage. The escape device is then readied to receive a threat.

During the threat period, the escape device has been told or has determined that a threat is detected and escape plans and actions should be undertaken. The model continues to be trained 111 from all information sources including stored data 112 and data that continues to be collected from sensors 113 and servers 114. The model is evaluated 115 based on its current training 111, stored data 112, continuing sensor data 113 and continuing server data 114. Outputs to guide the protected person are generated 116 and presented for action.

Referring to FIG. 10:

A diagram of the process for developing the pattern matching software for the embodiment of FIG. 9 is shown. The software to be developed is a recurrent neural net with an input layer, a recurrent layer, a additional fully connected hidden layer and an output layer. Other more complex structures are also easily implemented but this structure would be sufficient for the low level of accuracy needed in this embodiment.

The first step of the development is to accumulate 120 a data set for training and testing. Several data sets are required as described for FIG. 9. One set of data is collected by a device that is constructed similarly to that of FIG. 3 and the processor is programmed to collect data from the sensors and transmit it via the communication module to an outside data collection system. A substantial number of escape scenarios enacted or simulated and the resulting data is manually graded and entered into the database.

The data is divided into two sets with a larger portion for training and a smaller portion for accuracy testing. This is considered labeled data because it contains both input (sensor) data and the desired output for that data (presence or absence of transfer).

In this and related embodiments, a step in the development which might be started in parallel with data collection is the design of an appropriate neural network. The sizing of the layers and the setting of various factors in the neural net which are in addition to the factors and values (parameters) that are adjusted in training are collectively referred to as hyperparameters to distinguish them from the "parameters" which are adjusted in training the neural network. The hyperparameters are initialized 121 to appropriate values. In some systems that are taught hyperparameters are adjusted during the course of training but are distinct from trainable parameters because the adjustments are on the basis of the progress of the training rather than being direct functions of the data.

The next step is to initialize 122 the parameters which are to be trained. Appropriate initialization is necessary for reasonably rapid convergence of the neural net. A number of techniques are taught to product an initial set of values which produced good training progress.

The network is then trained 123 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally, the output of the network is used to back propagate through the network to provide further input to the adjustments. The items in the training portion of the dataset are used repeatedly while the convergence of the network is observed 124 by processes in the training data processor.

If the convergence is judged 125 not to be adequate the training is stopped, the hyperparameters are adjusted 126, the neural network is reinitialized and the training process is repeated until satisfactory convergence is obtained. The smaller portion of the data set which has been retained and not used for training is then passed 127 through the neural network (classified) and the output is checked 128 for accuracy. If accuracy is not sufficient for the goals of the particular system being developed then the net structure is made larger 129 and the training process is repeated until satisfactory accuracy is obtained.

The trained neural network is then downloaded 130 to the target device, which is then ready for system testing 131.

Referring to FIG. 11:

The basic operation of a compliance system is shown. In the depicted embodiment both acceptable 210 and unacceptable 211 images are used to train 212 a computer learning system model 213, which embodies the desired compliance. If the user is a night club venue with a dress code the images concentrate on clothes and other characteristics covered by the dress code. The model is uploaded 214 to a website 215 which is accessed by potential customers of the club. The model is downloaded 216 to an application in the customer's smartphone 217. The application uses the smart phone's camera to view 218 the customer or the customers proposed garments 219. The application has a computer learning module appropriate to apply the downloaded model to the image of the proposed garment and displays a decision 220 concerning the acceptability of the garment.

Referring to FIG. 12:

The training and operation steps of the model used to represent rules to be complied with and the situation for complience is shown. This diagram is intended to show the relationships between different levels of training of a model each of which builds on the levels below. The flow of the training and application of the model are shown by the arrow 230. The main diagram of the figure shows the detailed steps. The description is for a general neural net type of model. Other model types can follow the same general flow and neural nets can incorporate implementation details not shown. The model generally has layers which are arranged in the same order as the training steps and when a particular level of the model is being trained, data is evaluated by the earlier levels of the model which have already had training to provide inputs to the level being trained.

The model is initialized 231 with suitable values in a trainable parameter set. A basic data set 232 with basic information is used to perform the first level of training 233 the model. The model would generally have multiple layers and the basic data set would be used to train the earliest layers of the model. It would use data to allow these layers to recognize or react to features such as edges in pictorial data and sound impulses for audio data. This training would be applicable to many applications of a machine learning system. It may be provided by a supplier of implementation and hardware systems and these layers may be acquired in an already trained condition by implementations of applications. In the embodiment of FIG. 11 showing a dress code standard the first level would be similar to most models and be designed to process data from the kinds of sensors in the device that will finally use the model to evaluate compliance with the standard for the dress code.

The second level of training 234 in the depicted embodiment is done with a second "General" data set 235. This data is selected to allow the model to use inputs to recognize objects and entities relevent to the application of the model. The general data set in the depicted embodiment is generated by a combination of data generation from a simulation 236 of general applications of the model and specific data gathered 237 for such applications. The applications at this level include recognition of objects such as persons, articles of clothing, signs and other items used to define and the movements made by sensors as they traverse a scene. Prior to the training at this level layers are typically added 238 to the model to allow the training to take effect in facilitating analysis with the aid of the moved based on inputs processed by preceeding levels of trained model. In the embodiment depicted in FIG. 11 the second level would be able to recognise kinds of clothing, determine the content of text, and find out other factors that would serve to distinguish suitable and non-suitable dress. It would likely be generic for implementation of dress codes in general but would not at this level be using the specific dress code to be enforced.

The third level of training 239 in the depicted embodiment is done with a second "Specific" data set 240. This data is selected to allow the model to use inputs to recognize objects and entities relevent in a context relevant to a particular application of the model. The general data set in the depicted embodiment is generated by a combination of data generation from a simulation 41 of specific applications of the model and specific data gathered 42 for such applications. Typical information used to generate a simulation at this level include many variations of relevant objects for the purpose of applying standards similar to the one to be implemented. Prior to the training at this level layers are typically added 243 to the model to allow the training to take effect in facilitating analysis with the aid of the model based on inputs processed by preceeding levels of trained model. In the embodiment of FIG. 11 this level is used to train the model on the specifics of a dress code standard. Pictures of acceptable and non-acceptable dress are used for training to set up to allow the model to predict the acceptability of test sets.

After the model is trained through several levels, it is usually downloaded 244 from high powered training processors which are only used to prepare the model to a smaller portable processor to execute the model in actual use. To use the model to evaluate a situation data is gathered from the situation 245 by means of appropriate sensors and prepared to serve as an input 246 for the model. The model on the basis of (evaluating) the inputs generates 247 outputs 248 corresponding to the action of the training on the parameters of the model.

In some more advanced implementations of the system, inputs and outputs are used to select 249 additional training for the model. The information in the inputs and outputs can cause the download of sets of parameters which can be added to the model or a limited training process similar to that used to develop the original model can be accomplished by the evaluation processor.

Referring to FIG. 13:

FIG. 23 shows an embodiment where a machine learning compliance system is used to check women's lacrosse sticks for legality. The usual way that female lacrosse players take the ball from opponents is to dislodge the ball by striking the opponents stick with their own stick. A stick with a pocket that held the ball too tightly would be an unfair advantage. A complex system of rules for lacrosse sticks has grown up to prevent this. The particular existing rules used to illustrate this problem her are those published by the Federation of Internation Lacrosse, Women's Sector. During games the officials perform inspections of sticks which usually only check if the pocket has been made too deep by failing the expose the ball above the siderail of the stick. The particular rule is "The top of the ball, when dropped into the pocket of a horizontally held crosse, must be visible/seen above the top of the entire wooden or plastic sidewall after reasonable force with one hand has been applied to and released from a ball." This rule is fairly objective and can be reasonably applied by an official on the field, but there are many other rules which require judgement, measurement with instruments, and detailed interpretation to apply. In practice, the enforcement of these rules is by a system of approval of samples of new models of lacrosse sticks submitted by manufacturers. The approval system greatly slows adoption of new models and does not address variation after manufacture from wear, repair, user stringing adjustment, user modifications and outright cheating.

A device with a downloaded machine learning model and sensors can perform a much more through check of a lacrosse stick and provide confidence that the rules are being observed.

Referring again to said FIG. 13, a lacrosse stick 270 is shown being checked by an official 271 without the help of any device. The official observes that the ball 272 placed into the pocket extends higher than the sidewall of the stick's head. This stick passes the inspection. Another stick 273 is shown with a ball that does not extend over the sidewall and is declared illegal. This is usually the only check currently done, but an official may or may not observe other violations and will declare other faults in a potentially inconsistant manner.

A lacrosse stick 274 is shown with its handle end placed on a flat surface 275 and with a device 276 containing a sensor 277 placed on the head of the stick. A beam 278 from the sensor, which could be light, infrared, sonic or radio in nature depending on the choice of sensor, is projected to the flat surface and the length of the stick is measured from the reflection. The length determined by this process is used as one input to the machine learning model implemented in the device. By well know principles in the field of machine vision, various other dimensions of the object can be determined from use of a camera 280 or video sensor in a device 279, which may be the same device used to measure the length. These additional measurements are used as additional inputs to the machine learning model. The the case depicted the vision enabled device is requesting that the lacrosse stick be rotated to provide additional angles for visual inspection. There are several measurement based rules such the requirement that the overall length of the head be between 25.4 cm and 30.5 cm.

There are many rules that could be enforced by a machine learning system other than the linear measurements above. An additional example is shown in the laced lacrosse stick head 281 shown with three of its laces 282 run through a slot 283 above the lacing holes. This is in violation of a rule concerning attachment of a pocket to the head which requires attachment to the bottom of the bottom rail. This rule is reasonable because the variation in attachment heights of laces could provide a trapping effect for the ball which would be an unfair advantage. The rule as stated in the rulebook is complex and requires pictures to guide the officials. Violations in practice could be easily overlooked and an automated system would be helpful in preventing them.

Referring to FIGS. 14 to 16:

Law enforcement officers are often required to make judgements when motorists suspected of driving under the influence of alcohol or other intoxicating substances.

Chemical tests for alcohol levels are intrusive and in some places can only be required on the basis of a specific level of suspicion which may later be overturned in court. A non intrusive method of screening would be useful in eliminating the need for chemical tests in some cases and in justifying the requirement in other cases. A device with an appropriately trained machine learning model which video and audio information taken or recorded can provided this function.

FIG. 14 shows a police vehicle 290 which has stopped a vehicle 291 with a driver suspected of impaired driving. The driver 292 has left the car and in FIG. 15 and an officer 293 is collecting information about the driver with video and audio sensors in a device 294. The device does appropriate preprocessing of the information and supplies it as input to a machine learning model trained for this use. The device informs the officer with outputs signifying the probability that the driver is in fact impaired and the officer decide whether to do additional testing. The testing may consist of further data collection with the device or may require other types of testing. FIG. 16 shows two drivers which have been asked to stand on one foot as a test of their state. The device analyses their motions. Each driver is wobbling, but both sober and impaired drivers may wobble in this situation. The first driver 295 has his hands in his pockets which may contribute to the wobble. This driver is showing irritation with being stopped which may contribute to a lack of effort to stand steadily and may affect the impartiality of the officers judgement if evaluation is not made with an objective system. The second driver 296 is attempting to appear sober and pass the test and trying hard to stand in a steady manner. When the system is trained on a wide variety of potential persons and situations al of these factors will affect the trained behavior of the model.

An important reason to use an objective model is to prevent both the fact and appearance of unfairly judging persons with medical conditions that may appear falsely to some officers as evidence of impairment. Such errors can cause extreme embarrassment to law enforcement agencies. This can be prevented by using a large number of examples of persons with such conditions in training the system. The training should be objective in the sense of using training data with actual chemical or other objective test results. In this way, errors involving confusion of balance or speech impediments with effects of substance abuse can be reduced to very small levels.

Referring to FIG. 17:

A diagram of the process for developing the pattern matching software for a typical embodiment of a machine learning system is shown. The software to be developed is a recurrent neural net with an input layer, a recurrent layer, an additional fully connected hidden layer and an output layer. Other more complex structures are also easily implemented but this structure would be sufficient for the low level of accuracy needed in many embodiments. This figure shows training in one level and the steps would be repeated when training is accomplished in multiple levels. An example of multiple level training is shown in FIG. 12 which has basic, general and specific levels of training prior to download to the second platform for use and an "in-use" level after download. Thus, the system of FIG. 12 would use the steps of this figure up to four times. Certain steps, such as checks for convergence, may be omitted for certain levels.

The first step of the development at each level is to accumulate 310 a data set for training and testing. A device constructed similar to device for use of the system can be used to collect data that matches in its use of sensors and preprocessing but the processor is programmed to collect data from the sensors (such as item 280 of FIG. 13) and transmit it via the communication module to an outside data collection system. A dataset for the basic level of training (see 230 of FIG. 12) would typically consist of data to teach components of sensor inputs such as identifying edges in picture data and separating different sound sources. A dataset for the general level of training would train a model to recognize particular events and objects such as persons, clothing or the head of a lacrosse stick. A data set for the specific level would teach cases which distinguish between complying and non-complying situations. The data is usually divided into two sets with a larger portion for training and a smaller portion for accuracy testing. This is considered labeled data because it contains both input (sensor) data and the desired output for that data.

In this and related embodiments, a step in the development which might be started in parallel with data collection is the design of an appropriate neural network. The sizing of the layers, the pattern of interconnection between layers and between gates within layers (such as the addition of recurrency), and the setting of various factors in the neural net which are in addition to the factors and values (parameters) that are adjusted in training are collectively referred to as hyperparameters to distinguish them from the "parameters" which are adjusted in training the neural network. The hyperparameters are initialized 311 to appropriate values. In some systems that are taught hyperparameters are adjusted during the course of training but are distinct from trainable parameters because the adjustments are on the basis of the progress of the training rather than being direct functions of the data.

The next step is to initialize 312 the parameters which are to be trained. Appropriate initialization is necessary for reasonably rapid convergence of the neural net. A number of techniques are widely known to produce an initial set of values which generate good training progress toward convergence.

The network is then trained 313 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally, the output of the network is used to back propagate through the network to provide further input to the adjustments. The items in the training portion of the dataset are used repeatedly while the convergence of the network is observed 314 by processes in the training data processor.

If the convergence is judged 315 not to be adequate the training is stopped, the hyperparameters are adjusted 316, the neural network is reinitialized and the training process is repeated until satisfactory convergence is obtained. The smaller portion of the data set which has been retained and not used for training is then passed 317 through the neural network (classified) and the output is checked 318 for accuracy. If accuracy is not sufficient for the goals of the particular system being developed then the net structure is made larger 319 and the training process is repeated until satisfactory accuracy is obtained.

The trained neural network is then downloaded 320 to the target device or made ready for next level of training.

I claim:

1. A method of planning movement of a person in an area comprising:

operating a machine learning system implemented on a first processor with a machine learning model, wherein:
(a) the model has been pre-trained in a first step on a second processor with data concerning at least one of layout of areas of potential movement of persons and methods of movement of persons in areas of potential movement of persons
(b) the model has been transferred to one of the first processor and a third processor subsequent to the first step and prior to entry into the area by the person;
(c) the model has been trained in a second step subsequent to the transfer and subsequent to entry into the area by the person on one of the first processor and the third processor with data gathered subsequent to the entry with a sensor concerning at least one of a location of objects in the area, conditions in the area, and behavior of persons attempting to move in the area;
(d) the first processor has a memory containing a program to use the machine learning model to produce subsequent to the second step a plan to move in the area subsequent to the entry into the area; and
(e) guiding the person using an output device in moving in the area in accordance with the plan.

2. The method of claim 1 further comprising:
presenting the plan to the person with the output device.

3. The method of claim 2 wherein:
the output device is a least one of a visual display, an audible transducer and a tactile transducer.

4. The method of claim 1 further comprising:
a vehicle to move in the area wherein the vehicle is adapted to be operated autonomously to move in the area in accordance with the plan.

5. The method of claim 1 wherein:
the data of the first step concerns layout of the area.

6. The method of claim 1 wherein:
the data of the first step concerns methods of movement in the area.

7. The method of claim 1 wherein:
the data of the first step concerns behavior of persons moving in the area.

8. A device to plan movement in an area comprising:
operating a machine learning system implemented on a first processor with a machine learning model, wherein:
(a) the model has been pre-trained in a first step on a second processor with data concerning at least one of layout of areas of potential movement of persons and methods of movement of persons in areas of potential movement of persons
(b) the model has been transferred to one of the first processor and a third processor subsequent to the first step and prior to entry into the area by a person;
(c) the model has been trained in a second step subsequent to the transfer and subsequent to entry into the area by the person on one of the first processor and the third processor with data gathered subsequent to the entry with a sensor concerning at least one of a location of objects in the area, conditions in the area, and behavior of persons attempting to move in the area;
(d) the first processor has a memory containing a program to use the machine learning model to produce subsequent to the second step a plan to move in the area subsequent to entry into the area;
(e) an output device guides the person in moving in the area in accordance with the plan.

9. The method of claim 8 further comprising:
presenting the plan to the person with an output device.

10. The method of claim 9 wherein:
the output device is a least one of a visual display, an audible transducer and a tactile transducer.

11. The method of claim 8 further comprising:
a vehicle to move in the area wherein the vehicle is adapted to be operated autonomously to move in the area in accordance with the plan.

12. The method of claim 8 wherein:
the data of the first step concerns layout of the area.

13. The method of claim 8 wherein:
the data of the first step concerns methods of movement in the area.

14. The method of claim 8 wherein:
the data of the first step concerns behavior of persons moving in the area.

* * * * *